US008315973B1

(12) United States Patent
Kaiser et al.

(10) Patent No.: US 8,315,973 B1
(45) Date of Patent: Nov. 20, 2012

(54) METHOD AND APPARATUS FOR DATA MOVING IN MULTI-DEVICE FILE SYSTEMS

(75) Inventors: Scott Douglas Kaiser, Burlingame, CA (US); Par Botes, Mountain View, CA (US)

(73) Assignee: Symantec Operating Corporation, Mountain View, CA (US)

( * ) Notice: Subject to any disclaimer, the term of this patent is extended or adjusted under 35 U.S.C. 154(b) by 2205 days.

(21) Appl. No.: 10/951,971

(22) Filed: Sep. 28, 2004

(51) Int. Cl.
G06F 7/00 (2006.01)
G06F 17/00 (2006.01)
(52) U.S. Cl. .................. 707/609; 707/662; 707/667
(58) Field of Classification Search .................. 707/100; 709/214
See application file for complete search history.

(56) References Cited

U.S. PATENT DOCUMENTS

| 5,828,823 | A * | 10/1998 | Byers et al. ............... 714/24 |
| 6,725,394 | B1 * | 4/2004 | Bolt ........................... 714/7 |
| 6,816,891 | B1 * | 11/2004 | Vahalia et al. ............. 709/214 |
| 6,889,309 | B1 * | 5/2005 | Oliveira et al. ............. 711/203 |
| 2003/0110237 | A1 * | 6/2003 | Kitamura et al. ........... 709/219 |
| 2003/0172146 | A1 * | 9/2003 | Collins ...................... 709/223 |
| 2004/0193760 | A1 * | 9/2004 | Matsunami et al. .......... 710/36 |
| 2005/0091448 | A1 * | 4/2005 | Nakatani et al. ............ 711/113 |

FOREIGN PATENT DOCUMENTS

| JP | A-8-87031 | 9/1994 |
| JP | A-8-262491 | 3/1995 |

OTHER PUBLICATIONS

"SCSI Extended Copy Command," Working Draft SCSI Extended Copy Command Apr. 2, 1999, (34 pages).
Veritas Vertex Initiative, Veritas Software Corporation, 2000, (11 pages).

* cited by examiner

*Primary Examiner* — Hares Jami
(74) *Attorney, Agent, or Firm* — Robert C. Kowert; Meyertons, Hood, Kivlin, Kowert & Goetzel, P.C.

(57) ABSTRACT

A host of a multi-device file system may instruct an external data mover implementing a third party copy to move data from one storage device to another without the host reading or writing data as part of the move. The data being moved may remain accessible through the file system after being moved. A host may instruct an external data mover to write moved data to multiple mirrored devices. A host may instruct the data mover to move data between storage classes in a multi storage class file system. A journaling file system may utilize an external data mover implementing a third party copy to move data from a system log to another storage destination and may also instruct the data mover to move metadata as well as data.

20 Claims, 11 Drawing Sheets managing files of a multi-device file system including a plurality of storage devices
400 instructing a data mover to move data of a multi-device file system from a source device to a destination device
420 the data mover moving the data from the source device to the destination device without a host of the file system reading the data as part of the move
440

FIG. 5

METHOD AND APPARATUS FOR DATA MOVING IN MULTI-DEVICE FILE SYSTEMS

BACKGROUND OF THE INVENTION

1. Field of the Invention

This invention relates to data storage in general and, more particularly, to a method and apparatus for data moving in multi-device file systems.

2. Description of the Related Art

Modern business operations frequently rely upon continual access to large amount of data and the need for data storage capacity in enterprise systems is growing exponentially with no end in sight. Another primary concern of large enterprises is having their data available continuously. A file system may be defined as a collection of files and file system metadata (e.g., directories and inodes) that, when set into a logical hierarchy, make up an organized, structured set of information. File systems may be mounted from a local system or remote system. File system software often includes the system or application-level software that may be used to create, manage, and access file systems. In the past, file systems were typically implemented with either a single volume namespace, or with no volume namespace at all (e.g. directly on a single LUN), and thus all files in the file system have the same storage characteristics (e.g. type of storage device, reliability characteristics, etc.). Different storage devices and therefore volumes may have different performance characteristics, costs, and/or reliability characteristics. However, some files may be considered "more important" than others, and thus higher reliability characteristics may be desired for these files (even at the expense of lower performance characteristics). Other files may be frequently accessed and updated, and thus high performance characteristics may be desired (even at the expense of lower reliability characteristics). Additionally, files may have both data (the information stored in the file) and metadata (information about the data).

File system metadata may be defined as information that file system software maintains on files stored in the file system. File system metadata may include, but is not limited to, definitions and descriptions of the data it references. File system metadata may include one or more of, but is not limited to, inodes, directories, mapping information in the form of indirect blocks, superblocks, etc. Generally, file system metadata for a file includes path information for the file as seen from the application side and corresponding file system location information (e.g. device:block number(s)). File system metadata may itself be stored on a logical or physical device within a file system. For some applications, metadata is often considered as important as data, and thus high reliability characteristics may be desired. File systems also frequently log data to a transaction journal before storing the data as part of the full file system data storage. Generally systems use logging or journaling as a measure to ensure that the data can be recovered in the event of a system crash or other failure. When logging, the system may keep a copy of the in-flight data in memory so it can write it to its final destination on a storage device, such as a hard drive. Both data that needs to go to its final destination within a file, as well as metadata (or structures which describes how the file system is used or declare attributes of the data within the file system) are frequently written to a transaction log.

Traditionally, if a file system wants to change the location of data stored on a multi-device file system, a host process of the file system would need to move the data by reading the data from one device and writing the data to another device. For example, as illustrated by FIG. 1, a file system software executing on a host device, such as file system host 10, will generally read the data from its location on a storage device, such as a hard drive or storage device 30, into the host 10's system memory before writing the data out to the data's new location on destination device 40. A file system host, such as host 10, may communicate directly with the source and destination storage devices, or may communicate via another device in the storage network, such as a switch or other device that provides pass through access to storage devices, as illustrated by pass-through data access device 20 in FIG. 1. Generally, the host performing such a move would have fewer resources available during the move for other processes or tasks. Similarly, when a logging file system needs to move data from a transaction log to another storage location host software must first read the data from the log into memory and then write the data out to the data's new location on the storage device.

SUMMARY

In multi-device file systems, third party copy commands, SCSI extended copy commands, and other data movers, may be used to move data between storage subsystems or between individual storage devices of the file system without a host of the file system reading or writing the data as part of the move, according to some embodiments. In such an embodiment, file system software executing on a host for a multi-device file system may instruct a data mover to move data of a file from a source storage device to a destination storage device of the multi-device file system. According to certain embodiments, a data mover executes external to the host device and may implement a third party copy, such as a SCSI extended copy to move data between storage device. The data mover may move data from the source storage device to the destination storage device without the host reading or writing the data as part of moving the data. In such an embodiment, the data being moved may be accessible through a single file identifier associated with the file, or some other name resolution mechanism, both before and after such a move. For example, in one embodiment, an application may be able to access the data before such a move using a particular path and filename and may be able to continue using the same path and filename after such a move. In other words, the data may be moved, rather than just duplicated, using a third party copy command or data mover, according to certain embodiments. In one embodiment, the data may be also available to file system software or therefore applications while being moved. In other embodiments, however, the file system software may stop or quiesce I/O for the data while that data is being moved.

In certain embodiments, an application accessing moved data might not be able to tell that the data was moved. In one embodiment, a multi-device file system may include two or more mirrored storage devices and a data mover may be configured, when moving data, to write the data to both mirrored devices. Thus, a host of a multi-device file system may be able to instruct a data mover to move and mirror data at one time. In some embodiments a data mover may execute on a device that is part of a storage subsystem, such as a device that controls one or more physical storage devices. Additionally, in certain embodiments, a data mover may execute on a switch, hub, bridge or other device as part of a network fabric, such as a SAN fabric.

In certain embodiments, a file system may organize data into multiple storage classes and the host software of such a file system may instruct a data mover to move data in response to applying monitored access information to a set of storage polices. In such an embodiment, the data mover may be moving data from one storage class to another of the file system. In yet other embodiments, a journaling, or log-structured, file system may utilize a third party copy command, such as a SCSI extended copy command, to move data from a file system log or journal to another storage destination. For example, in one embodiment, a host of a log-structured file system may log a data write request to a storage device and may instruct a data mover to move the data from the log on one storage device to a destination storage device. In certain embodiments a journaling file system may also log metadata related to a data write request and instruct a data mover to move the metadata as well. Additionally, in some embodiments, a host of a logging file system may also instruct a data mover to mirror data moved from a file system log to another storage device.

BRIEF DESCRIPTION OF THE DRAWINGS

FIG. 5 is a flowchart illustrating a method for applying third party copy commands in a multi-device file system, in one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
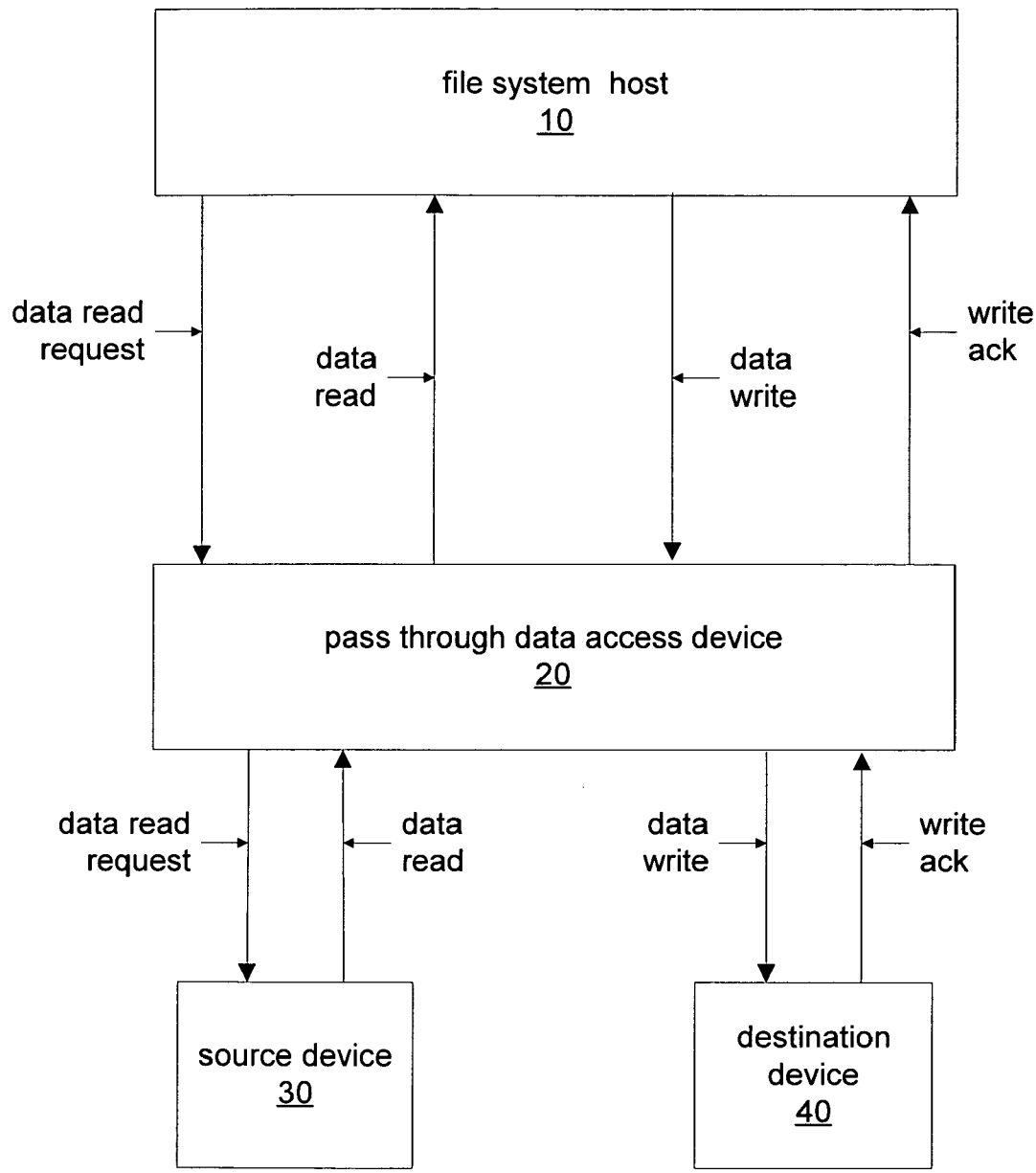
FIG. 1 is a block diagram illustrating, according to the prior art, a file system host moving data between storage devices.
Figure 2:
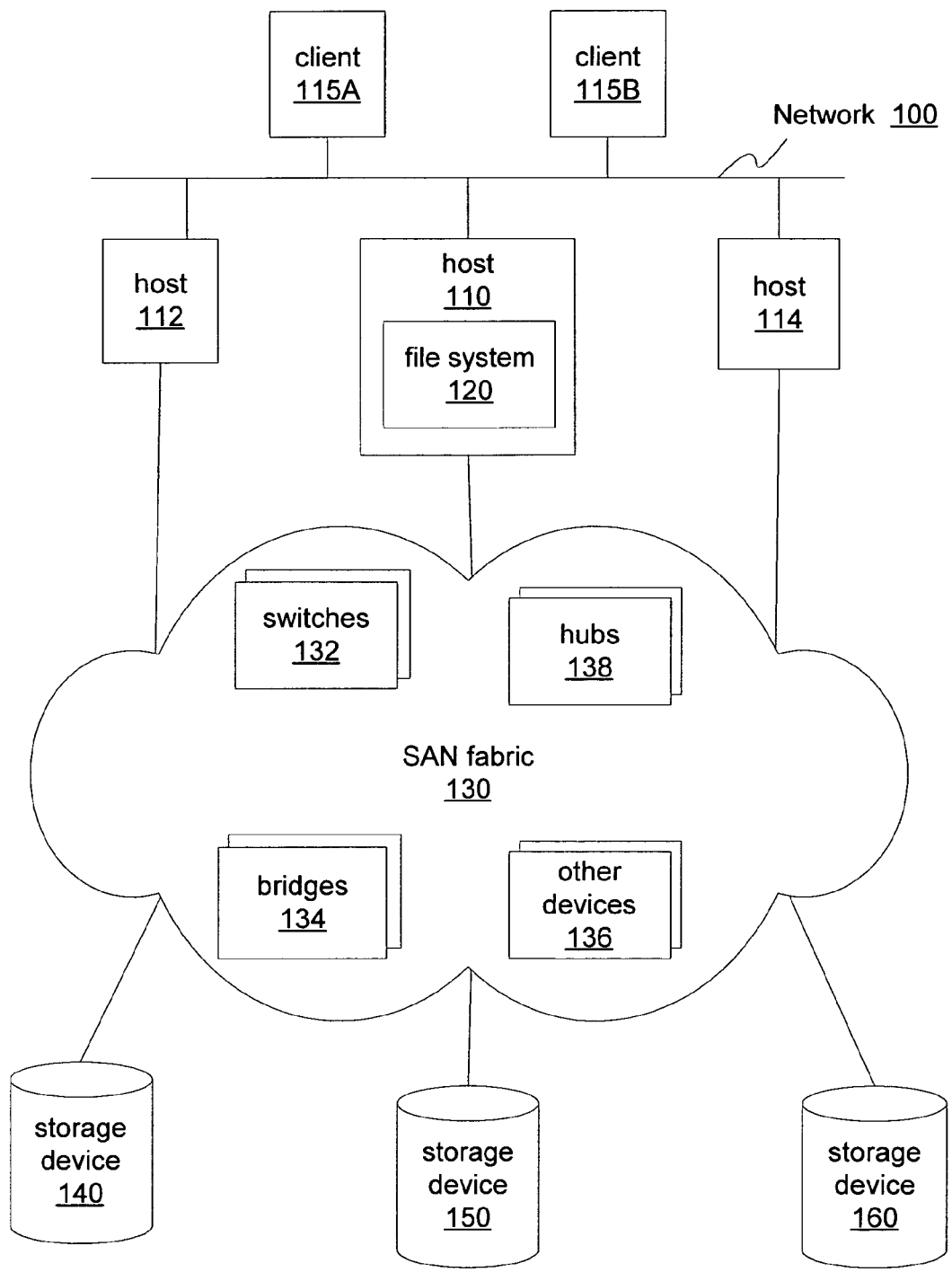
FIG. 2 is a block diagram illustrating an exemplary multi-device file system applying third party copy commands, according to one embodiment.

FIG. 2 illustrates a computer network, according to certain embodiments, in which file system host software may be configured to utilize an external data mover or other third party copy command, such as a SCSI extended copy command, to move data within a multi-device or log-structured file system. FIG. 2 illustrates an exemplary SAN system capable of implementing embodiments of applying third party copy commands to both journaling and multi-device file systems, according to one embodiment. A SAN system is just one of numerous possible embodiments of storage and file systems capable of using third party copy commands as described herein. A SAN may be a high-speed network that enables fast, reliable access among host/servers 110, 112, and 114 and storage devices 140, 150, and 160. A SAN may be used to connect servers to storage devices, servers to each other, and storage devices to other storage devices through combinations of hubs 138, switches 132, bridges 134, and/or other devices 136 collectively referred to as a SAN Fabric 130.

According to one embodiment, file system 120 may use a data mover or other device capable of responding to a third party copy command, possibly executing within SAN fabric 130, to move data between or among storage devices 140, 150, and 160. In response the data mover may move the data between the storage devices without requiring file system 120 to read or write the data as part of the move, in some embodiments. Without using an external data mover, the file system software or file server software must generally perform the actual reading and writing of the data in order to affect such a move.

A SAN may include a number of SAN fabric components, such as switches, hubs, bridges, or other devices, that perform various functions within the SAN system and depending on the number of host/servers and storage devices that the SAN will interface. For example, hub 138 may perform a repeater function, which is to amplify and/or regenerate a received signal and provide it at multiple outputs. A hub takes the data that comes into one port and sends it out all other ports that are included in the hub. It doesn't usually perform any filtering or redirection of data. Bridges 134 are useful for joining networks made of different media types or protocols together into larger networks, and keeping network segments free of data that doesn't belong in a particular segment. Bridges 134 may join networks or network segments, which use different protocols. In such cases, the bridge may perform lower layer translation on the packets that it transfers from one network to another. In some embodiments, the SAN may include only a subset of the types of SAN fabric components.

SAN fabric 130 may also include a data mover or third party copy mechanism. In some embodiments a data mover may be implemented as a stand-alone component separate from the other components of SAN fabric 130, but in other embodiments, the data mover may be implemented as a part of one of the other components of the SAN fabric. In general, a data mover function may be located anywhere within the SAN fabric, within any of the components previously described. In addition, the data mover may also be implemented as a component of a data storage device, such as storage device 140, 150, or 160, according to one embodiment.

One or more end-user platforms (clients 115) may access the SAN, typically via a LAN or WAN connection to one or more of the hosts 120 to access data stored on storage devices 140, 150, and 160. Storage devices 140, 150, and 160 may include one or more of, but are not limited to, RAID (Redundant Array of Independent Disks) systems, disk arrays, JBODs (Just a Bunch Of Disks, used to refer to disks that are not configured according to RAID), tape devices, and optical storage devices. Normally, an enterprise's data may be stored on disk drive type storage devices to provide fast access time. Generally, clients of a file system access data through a host or file server of the file system. Host/servers 110, 112, and 114 may be any of various types of devices, including, but not limited to, personal computer systems, desktop computers, laptop or notebook computers, mainframe computer systems, workstations, network appliances, network computers, Internet appliances, or other suitable devices. Host system 110 may include at least one processor. The processor may be coupled to memory. Memory is representative of various types of possible memory media, also referred to as "computer readable media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

SANs and other file systems capable of using data movers, such as multi-device and journaling file systems, may be implemented using a wide variety of technologies. The SAN mix can include Enterprise Systems Connection (ESCON), Fiber Distributed Data Interface (FDDI), Asynchronous Transfer Mode (ATM), IBM's Serial Storage Architecture (SSA), and Fibre Channel. SAN architectures may also implement a number of underlying protocols, including TCP/IP and variants of SCSI (Small Computer System Interface). The most popular implementation of SAN for open systems is based on SCSI over Fibre channel. Fibre Channel Protocol (FCP) specifies how to run the SCSI command set over a dedicated Fibre Channel optical fabric. In direct server attached storage, a local SCSI controller on a peripheral bus fulfills a data request initiated by a SCSI driver in the host server. On a SAN, a Fibre Channel host bus adapter (HBA) may replace the SCSI controller in each server 120 to connect to the SAN fabric 130, which in turn may connect to disk arrays, tape drives, and other storage devices.

A LUN (logical unit number) is the SCSI identifier of a logical unit within a target, the system component that receives a SCSI I/O command. A logical unit is an entity within a SCSI target that executes I/O commands. SCSI I/O commands are sent to a target and executed by a logical unit within that target. A SCSI physical disk typically has a single logical unit. Tape devices and array controllers may incorporate multiple logical units to which I/O commands may be addressed. Each logical unit exported by an array controller may correspond to a virtual disk. SAN fabric 130 may be implemented, for example, in accordance with the Fibre Channel Switch Fabric-2 (FC-SW2) open standard specification to provide redundancy and ensure high data availability. SANs may be deployed in both homogeneous and heterogeneous environments. In a heterogeneous environment, a SAN may allow different kinds of servers, e.g. Windows NT, UNIX, Linux, Netware, and OS/390, to share different kinds of storage, e.g. disk, tape, and redundant arrays of inexpensive disks (RAID). With this shared capacity, organizations may be able to acquire, deploy, and use storage devices more cost-effectively.

Network 100, as illustrated in FIG. 2, may comprise any of various network technologies according to various embodiments. Network 100 may be a local area network, wide area network, intranet network, Internet network, or many other types of network. Network 100 may be designed to be continuously available (although network outages may occur), or may be intermittent (e.g. a modem connection made between a computer system in a user's home and a computer system in a user's workplace). Network 100 may utilize any of a number of different physical networking technologies including, but not limited to, Fiber Channel, Ethernet, Fast-Ethernet, Gigabit-Ethernet, Myrinet, Infiniband, VAX CI, or ServerNet, or others. Network 100 may be configured according to a number of different network topologies including, but not limited to, star, token-ring, token-bus, scatternet, dual-ring, mesh, etc. Network 100 may also be configured to utilize a combination of different networking technologies and/or topologies. Additionally, Network 100 may comprise shared storage or shared memory for communicating between different computer systems or between processes within the same computer system, according to some embodiments. In some embodiments, Network 100 may be the interconnect network for any of various distributed shared storage environments, including, but not limited to, network file system (NFS), common Internet file system (CIFS), storage area network (SAN), network attached storage (NAS), storage-network aggregation, multi-site block storage, object-based storage devices (OBSD), or other asymmetric, out-of-band, or shared storage models.

A storage device, such as storage device 140, 150, or 160, may be any type of networkable computing device capable communicating with and providing data storage services to other devices or processes in a distributed shared storage environment. According to various embodiments, storage devices 140, 150, and 160, may be configured to implement any of numerous data storage models including but not limited to, storage-network attach, storage-network aggregation (SNA), network attached storage (NAS), storage area network (SAN), Redundant Array of Independent (or Inexpensive) Disks (RAID), or as object-based storage devices (OBSDs). In certain embodiments, storage devices may be configured to implement a combination of different data storage models. Storage devices may utilize one or more of numerous types of storage media including but not limited to Hard disk storage, floppy disk storage, removable disk storage, flash memory and random access memory (RAM) are examples of storage media. The terms "storage" and "storage medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The storage medium may include other types of storage as well, or combinations thereof.

Host software or file server software of multi-device or journaling file systems may, in some embodiments, instruct an external data mover or other device on a network to move data between two or more storage devices of the file system. File system software for a multi-device file system presents data is a unified manner as if the data resides on a single storage device even though that data may physically be stored on a number of storage devices. A file server in a multi-device file system maintains, at the file system level, a single path to each file in the file system, even if the data of that file is moved from one storage device to another. For example, an application may access a file of a multi-device file system using a specific filename and path. The host of that file systems may move the contents of that file from one storage device to another while ensuring that the file is still available via the same filename and path both before and after the move.

When using an external data mover to move data, the host may not need to perform any reading or writing of the data as part of the move. Host software of a multi-device file system may move data for a variety of reasons, such as for ensuring that important data resides on more reliable storage devices, moving data between different storage classes, for mirroring purposes, or to ensure that frequently access data resides on higher performance storage devices, according to various embodiments. When moving file data between storage devices in a multi-device file system, the host software may ensure that the file data is available before, after, and potentially during, the move through the same file identification mechanism, such as through a filename and path, according to various embodiments.

Journaling, or log-structured, file systems may move data from a file system log to a destination location on a storage device, in one embodiment. File system software in either a multi-device file system or a journaling file system, such as file system 120 for instance, may instruct an external data, such as may be configured to execute on a switch, hub, bridge, or other device in a network fabric, such as SAN fabric 130, to move data between storage devices, such as storage devices 140, 150, or 160. For example, file system 120 may be configured to store data for file I/O requests to the file system log and may then instruct an external data mover to flush the data from the log by moving it to a destination storage device. When using an external data mover, file system 120 may only have to instruct the data mover regarding the data to move, and may not have to perform any reading or writing of the data as part of the move. Using a third party copy command or other external data mover may allow a log-structured file system, such as file system 120, to improve both read and write performance by saving data only to the log and instructing the data mover to move the data out of the log. Thus, the file system may be able to return a successful completion of the I/O request to an application even before the data is relocated to its actual destination.

Figure 3:
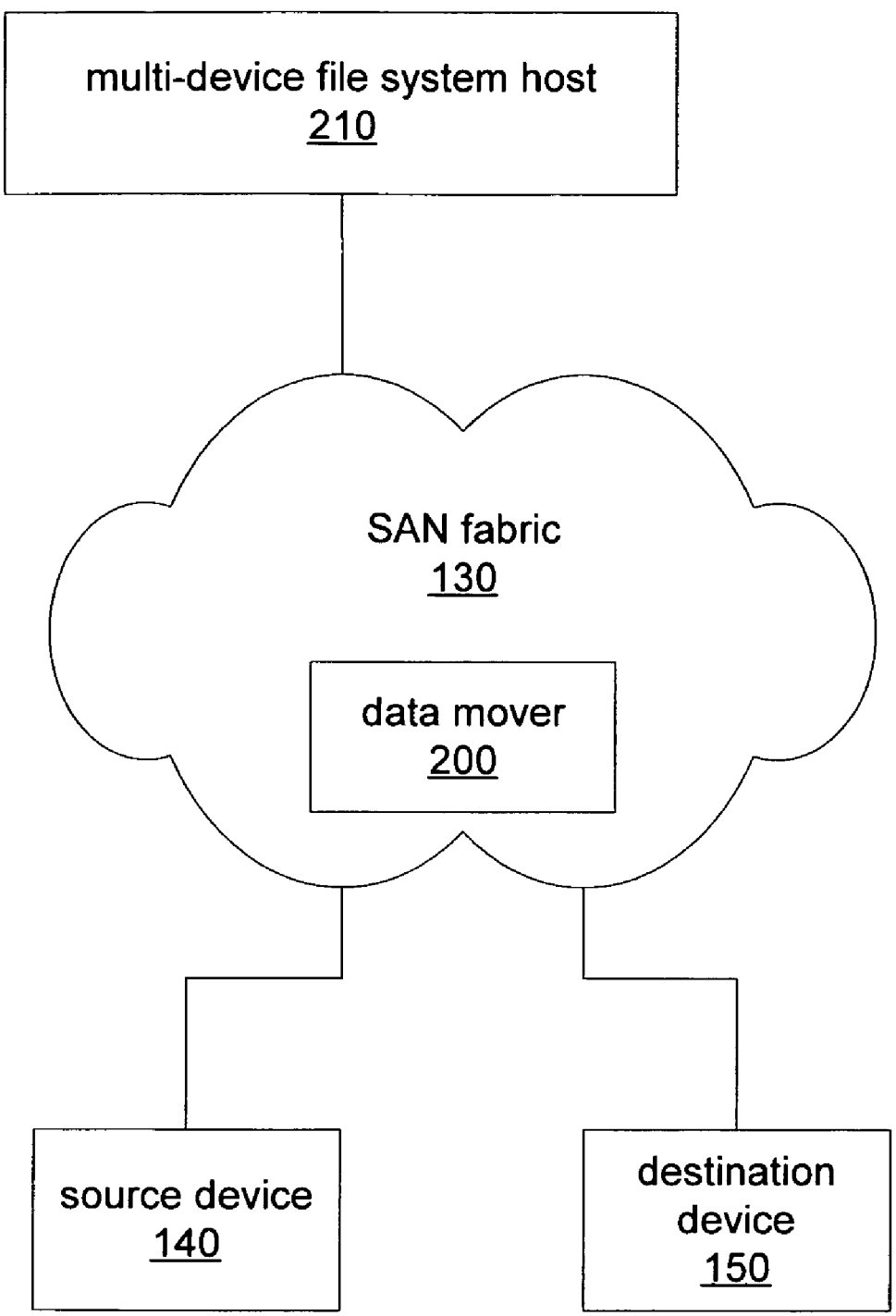
FIG. 3 is a block diagram illustrating a system suitable for implementing a multi-device file system host that utilizes an external data mover for moving data between storage devices, in one embodiment.

FIG. 3 is a block diagram that illustrates, according to one embodiment, a system suitable for implementing a multi-device file system in which a host of the multi-device file systems instructs a data mover to apply a third party copy command to move data between storage devices. For example, multi-device file system host 210 may, in some embodiments, manage file in a multi-device file system implemented using SAN fabric 130. As described above, a SAN fabric may include devices, such as bridges, hubs, and switches, that may be configured to implement a third party copy command, such as a SCSI extended copy command, to move data between storage devices connected to SAN fabric 130, such as source device 140 and destination device 150. In one embodiment, if host 210 desires to move data, such as a file, from source device 140 to destination device 150, host 210 may instruct or request data mover 220 to perform the move. For instance, in one embodiment host 210 may use a remote procedure call (RPC) to instruct data mover 200, while in another embodiment host 210 may send a specific IP message to data mover 200 including a request for data moving. Data mover 200 may, in response to such a request read the data from source device 140 into memory and then write the data out to destination device 150, without host 210 having to read or write the data as part of the move. In addition, in some embodiments, the moved file may be available through the same filename and path both before and after the move.

Figure 4:
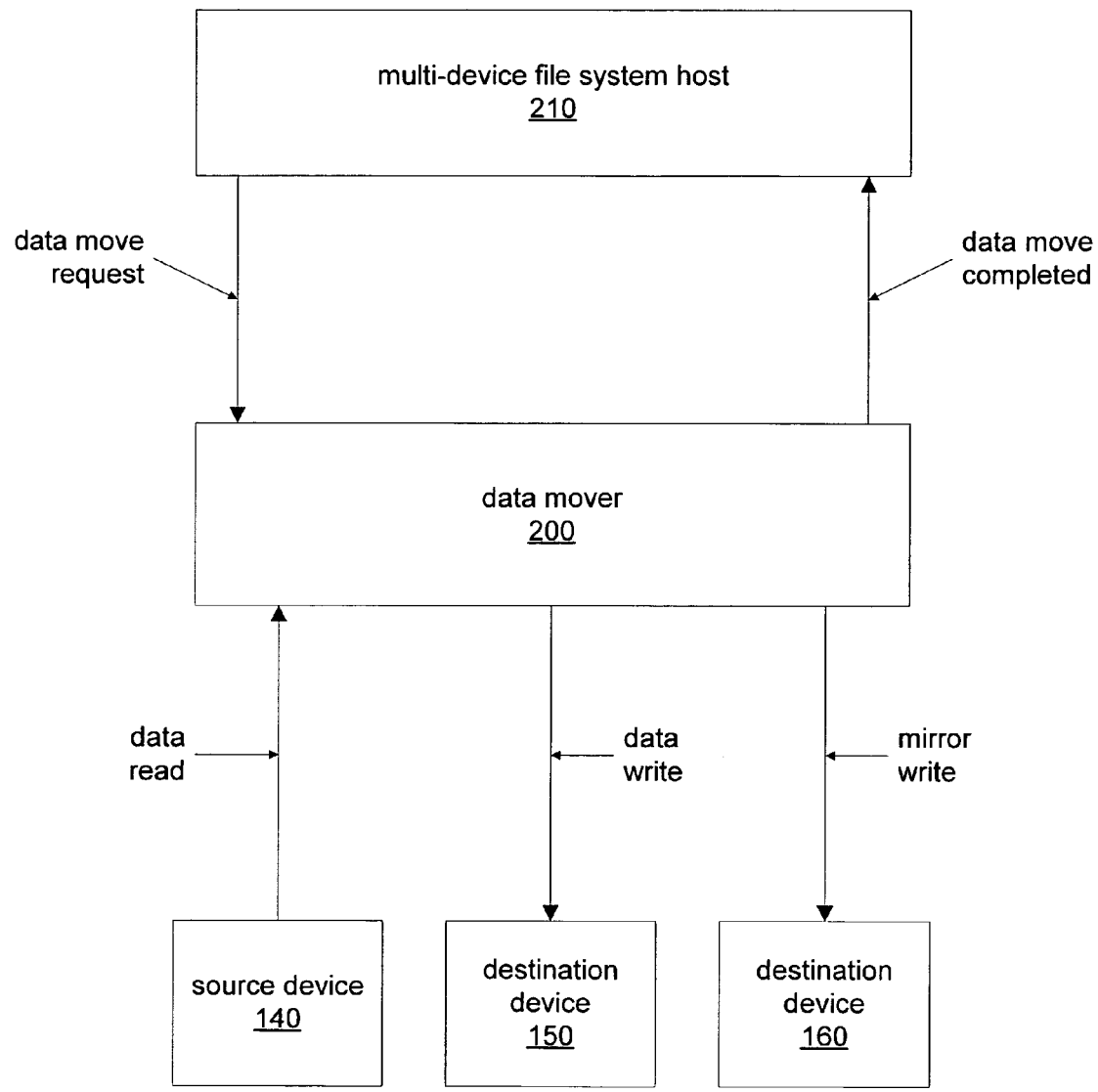
FIG. 4 is a block diagram that illustrates one embodiment showing a host using a data mover to apply a third party copy command to a multi-device file system.

FIG. 4 is a block diagram illustrating one embodiment of a file system host using a data mover move data in a multi-device or journaling file system. A host of a multi-device file system, such as multi-device file system host 210, may utilize a data mover, such as data mover 200, to move data between devices of the multi-device file system. For example, host 210 may request data mover 200 to move data from source device 140 to destination device 150, according to one embodiment. Host 210 may desire to move data for any number of reasons, according to various embodiments. For example, host 210 may be configured to move less frequently access data to lower performance storage devices, in one embodiment. In another embodiment, host 210 may be configured to move data based on storage class policies. According to some embodiments, host 210 may not read or write the data as part of moving the data when using an external data mover, such as data mover 200. Rather than moving the data itself, host 210 may rely upon data mover 200 to perform all reading and writing necessary to move the data from one storage device, or storage subsystem, to another. In certain embodiment, data may be moved between multiple storage sub-systems, each including multiple storage devices. For instance a file system may utilize multiple RAID storage subsystems, and thus data may be moved between two storage subsystems, not just between individual storage devices, according to various embodiments. Additionally, file system software may utilize an external data mover to move data between two different storage devices within a single storage subsystem.

In certain embodiments, a host may also desire to mirror the data as it is moved. For example, host 210 may instruct data mover 200 to move data from source device 140 to destination device 150 and to also mirror the data to destination device 160. Data mover 200 may then read data from source device 140 and write the data to both destination device 150 and destination device 160 without host 210 having to be involved in the actual moving of the data. In some embodiments, host 210 may specifically include mirroring instructions when requesting that data mover 200 move data. For instance, a specific move with mirror SCSI command may be implemented that allows for such mirroring instructions. In other embodiments, host 210 may be able to configure data mover 200 to always mirror when moving data.

The specific mechanism used to instruct or request the movement of data between storage devices may vary from embodiment to embodiment. For example, in one embodiment, host 210 may issue a remote procedure call to data mover 200, while in another embodiment, host 210 may send a network message to data mover 200 including a data move request. In other embodiments, data mover 200 may represent a customized SCSI external copy command that can be called from host 210. In general, any form on inter-process or inter-device communication may be used by to instruct data mover 200 and to request the movement of data between storage devices or storage subsystem. The details of such communication may vary according to the specific nature of the file system and its underlying network or fabric and are well understood in the field of network communication and so will not be discussed herein.

FIG. 5 is a flowchart illustrating a method for applying third party copy commands in a multi-device file system, according one embodiment. File system software on the host in a multi-device file system may manage one or more files of the multi-device file system that includes a plurality of storage devices, as illustrated by block 400. For example, in some embodiments, a host or file server may provide or serve files to client applications requesting file I/O to various files stored on devices of the file systems. There are various methods for storing the files across the devices of the multi-device file system, according to various embodiments. For example, a SAN system is illustrated in FIG. 2 and described above. Additionally, a host, file server, or other process of the file system may instruct a data mover to move data from a source device to a destination device of the multi-device file system, as illustrated by block 420. For instance, in some embodiments, a host may desire to move less frequently accessed data to a slower storage device.

In one such embodiment, file system 120 on host 110 may instruct an external data mover, perhaps residing on a switch 132 or hub 138 on SAN fabric 130, to move the data from its current location on storage device 140 to a new location on storage device 150. The data may remain active or online before, after, and potentially during, the move. An application accessing the data both before and after the move may not be able to tell the data was moved, according to certain embodiments. For example, the file server may update its own metadata regarding how to access the file from its new location without requiring a new filename or path and thus a move may be transparent to an application or client requesting the data.

Additionally, in response to the host's instructions or requests, a data mover, such as a device implementing an SCSI extended copy command, may move the data from a source device to the destination device without the instructing host of the file systems reading the data as part of the move, as illustrated by block 440. Thus, in one embodiment, the instructing host may not have to participate in the actual moving of the data at all, other than to instruct an external data mover. And in some embodiments, the host or file server may then be able to perform some other task or process with the memory and/or CPU resources that would otherwise be unavailable if the host performed the data move. Additionally, using a data mover may reduce the latency incurred during the move by eliminating one or more network links or "hops" the data would otherwise travel if the host were moving the data. Thus, in some embodiments, using an external data mover or third party copy mechanism may reduce the amount of host resources (memory, CPU time, etc) that are required to move the data.

In some embodiments, a multi-device file system may organize data using a hierarchy of storage classes and each storage class may include one or more storage devices according to the individual characteristics of each storage class. In some embodiments, host software of multi-class, multi-device file system may monitor access of data in the file system to generate access information for the data and may apply the generated access information to a set of polices to determine what data is stored under which storage classes. For example, in one embodiment, data may be organized and stored in different storage classes based upon the data's overall importance, with more important data assigned to storage classes that use more reliable storage devices. In other embodiments, data may be assigned to storage classes based upon the access frequency of the data with less frequently access data being moved to storage classes using slower storage devices.

Please note that FIG. 5 represents just one of many possible embodiments of a method for file system software of a journaling or multi-device file system to apply a third party copy command. Other embodiments may include different or additional steps than those illustrated in FIG. 5 and described above.

Figure 6:
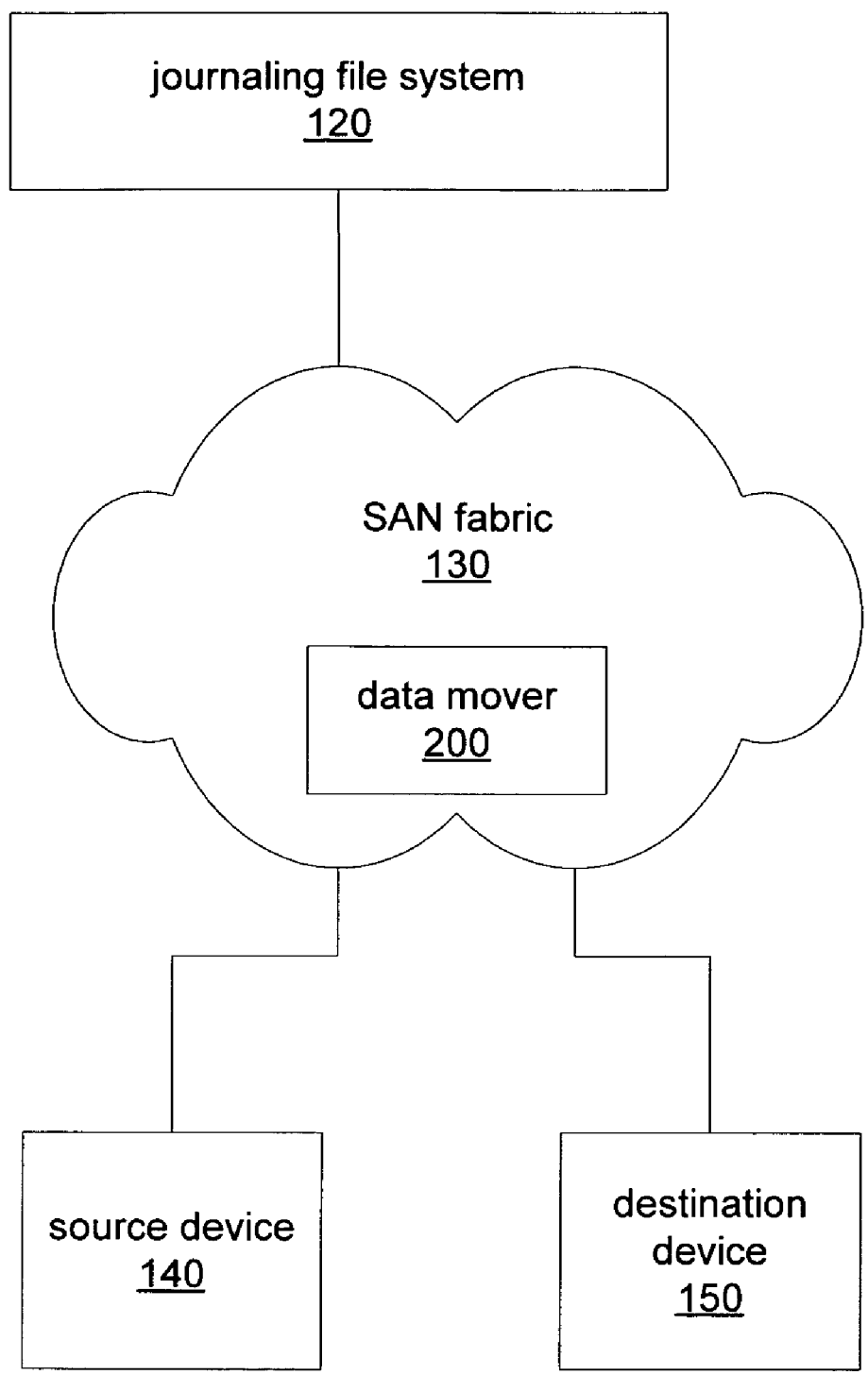
FIG. 6 is a block diagram illustrating, according to one embodiment, a system suitable for implementing a journaling file system host that utilizes an external data mover for moving data between storage devices.

FIG. 6 is block diagram of a system suitable for implementing a journaling or log-structured file system that utilizes a data mover to move data between storage devices. A journaling file system logs, or temporarily stores, the data from I/O requests to one location, called the log or journal, before storing the data to its destination in the file system. File system software on a host of a journaling file system may use an external data mover to move data between a log on one device to a target location on another device of the file system, according to some embodiments. For example, journaling file system 120 may, in one embodiment, manage file on a file system using SAN fabric 130. SAN fabric 130 may include one or more devices, such as hubs, switches, bridges, etc. that may include a data mover, such as data mover 200, in some embodiments. In some embodiments, data mover 200 may implement a third party copy command, such as a customize SCSI extended copy command to move data between storage devices attaches to SAN fabric 130.

In one embodiment, for example, journaling file system 120 may receive a file write request and log it to a log on source device 140, according to certain embodiments. When logging the I/O request, file system 120 may log any data included in the I/O request in a log structure on source device 140 temporarily before moving it to destination device 150. When moving the logged data from source device 140 to destination device 150, file system 120 may, in one embodiment, instruct data mover 200 to move the data. Data mover 200 may then, in one embodiment, read the data from source device 140 into memory and then write the data to destination device 150 without journaling file system 120 having to read or write the data as part of the move. In some embodiments, journaling file system 120 may be configured to perform other tasks while data mover 200 is performing the move.

Figure 7:
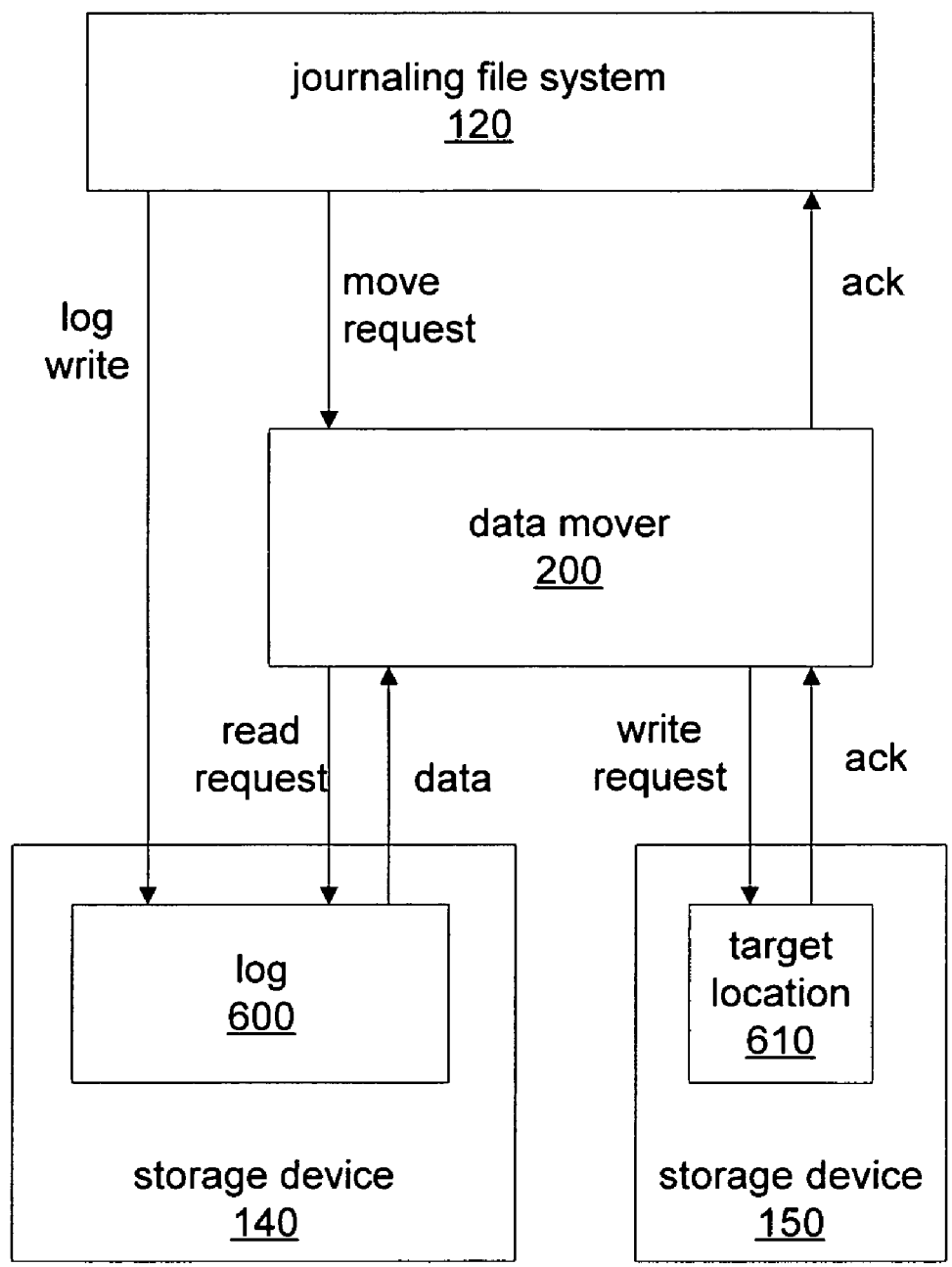
FIG. 7 is block diagram illustrating a journaling file system applying a third party copy command through a data mover, according to one embodiment.

FIG. 7 is block diagram illustrating, according to one embodiment, a journaling file system applying a third party copy command. For example, journaling file system 120 may receive a file write request from an application and may log the data for that write in log 600 on storage device 140. File system 120 may then instruct or request data mover 200 to move the data from log 600 on storage device 140 to target location 610 on storage device 150, according to one embodiment. In response to a move request from file system 120, data mover 200 may read the data from log 600 on storage device 140 and may then write the data to target location 610 on storage device 150 without file system 120 reading or writing the data as part of the move.

In some embodiments, file system 120 may not be involved in moving the data at all other that to request or instruct data mover 200 to move the data. Thus, by using data mover 200 to move the data from log 600 to target location 620, file system 120 may be able to perform other tasks or processes using resources that might not be free if file system 120 were moving the data, according to some embodiments. Instructing an external data mover to move data between the system log and another storage location may prevent file system software from having to read the data from the log into memory and then store the data to its destination location on another storage device, in some embodiments.

In one embodiment, file system 120 may instruct data mover 200 to move both data and metadata from log 600 on storage device 140 to one or more target locations, such as target location 610, on storage device 150. In another embodiment, file system 120 may also instruct data mover 200 to mirror the data while moving it. For example, data mover 200 may write the data to target location 610 on storage device 150 and may also write the data to a target location on another storage device not illustrated in FIG. 7, such as storage device 150. In one embodiment, file system 120 may specifically instruct data mover 200 to mirror data moved from log 600 to target location 610, while in another embodiment, data mover 200 may be configured to mirror all data moved to storage device 150. Thus, in mirroring of data moved by an external data mover may occur for different reasons in different embodiments.

Figure 8:
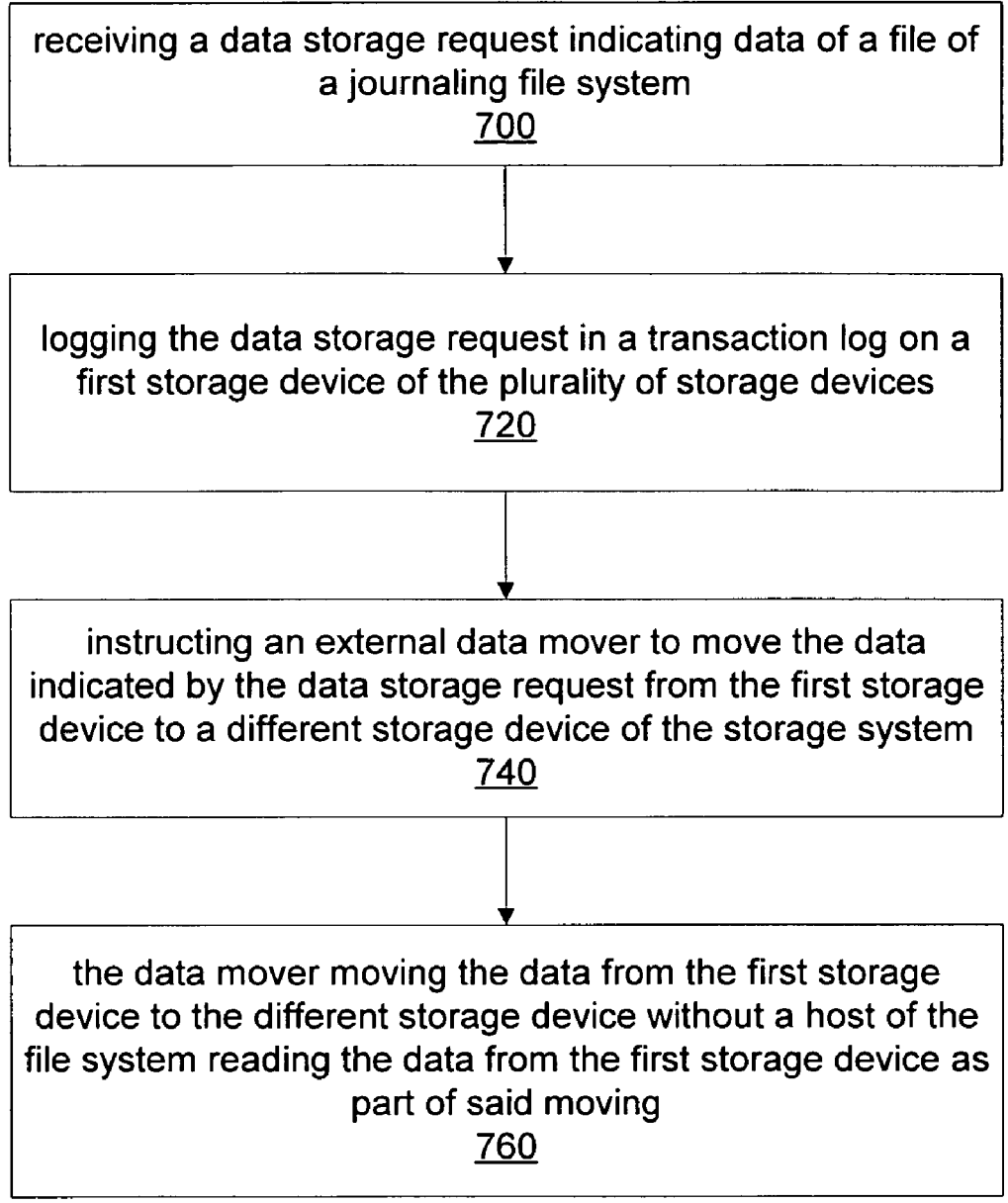
FIG. 8 is a flowchart illustrating one embodiment of a method for a journaling file system to apply a third party copy command.

FIG. 8 is a flowchart illustrating one embodiment of a method for a journaling file system to apply a third party copy command. A journaling file system, such as file system 120 may receive a data storage request indicating data of a file of the journaling file system, as illustrated by block 700, and may log the data storage request in a transaction log o a first storage device of a plurality of storage devices, as illustrated by block 720. For instance, in one embodiment, file system 120 may log data associated with a received data storage request from client 110 in log 600 on storage device 140. Additionally, a file system may instruct an external data mover to move the data indicated by the data storage request from the first storage device to a different storage device of the storage system, as illustrated by block 740. For instance, file system 120, after logging the data associated with a received data storage request may, in one embodiment, instruct data mover 200 to move the data from storage device 140 to storage device 150.

In response to a data remove request, a data mover may move the data from the first storage device to the different storage device without a host of the file system reading the data from the first storage device as part of moving the data, as illustrated by block 760. Thus, in one embodiment, data mover 200 may move the data from storage device 140 to storage device 150 without file system 120 having to read or write the data as part of the move. In some embodiments, file system 120 may only issue a data move request and data mover 200 may perform all other tasks associated with moving the data. In certain embodiments, file system 120 may be free to perform other tasks while data mover 200 is moving the data.

Please note that FIG. 8 represents just one of many possible embodiments of a method for a journaling file system to apply a third party copy command. Other embodiments may include different or additional steps than those illustrated in FIG. 8 and described above.

Figure 9:
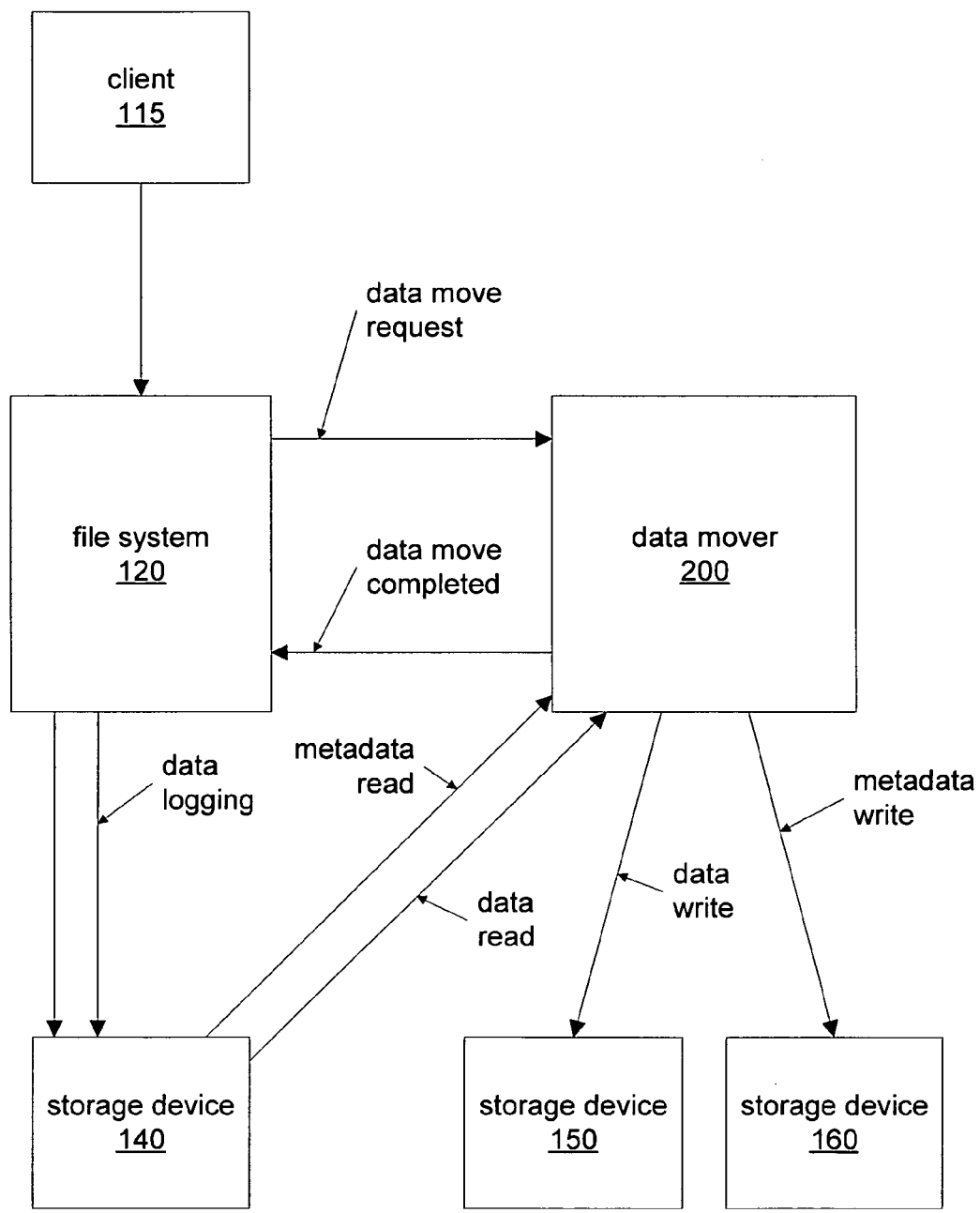
FIG. 9 is a block diagram illustrating a journaling file system using a third party copy command to move both data and metadata, in one embodiment.

FIG. 9 is a block diagram illustrating a journaling file system using a third party copy command to move both data and metadata, in one embodiment. A journaling file system may use an external data mover to move both data and metadata, according to various embodiments. For example, file system 120 may receive a data storage request from client 115 and may log both data and metadata regarding the received data storage request to storage device 140. After logging the data and metadata associated with a data storage request, file system 120 may, in one embodiment, instruct data mover 200 to move the data and metadata from storage device 140 to one or more other storage devices, such as storage device 150 and storage device 160. In one embodiment, both the data and metadata may be moved to the same destination storage device, as described above regarding FIG. 5. In another embodiment however, the data may be moved to one storage device, such as storage device 150 and the metadata may be moved to another storage device, such as storage device 160. In response to a data move request from file system 120, data mover 200 may move the data from storage device 140 to storage device 150 and may move the metadata from storage device 140 to storage device 160. As described above, data mover 200 may also mirror the data and metadata at the same time as moving them, according to certain embodiments.

Figure 10:
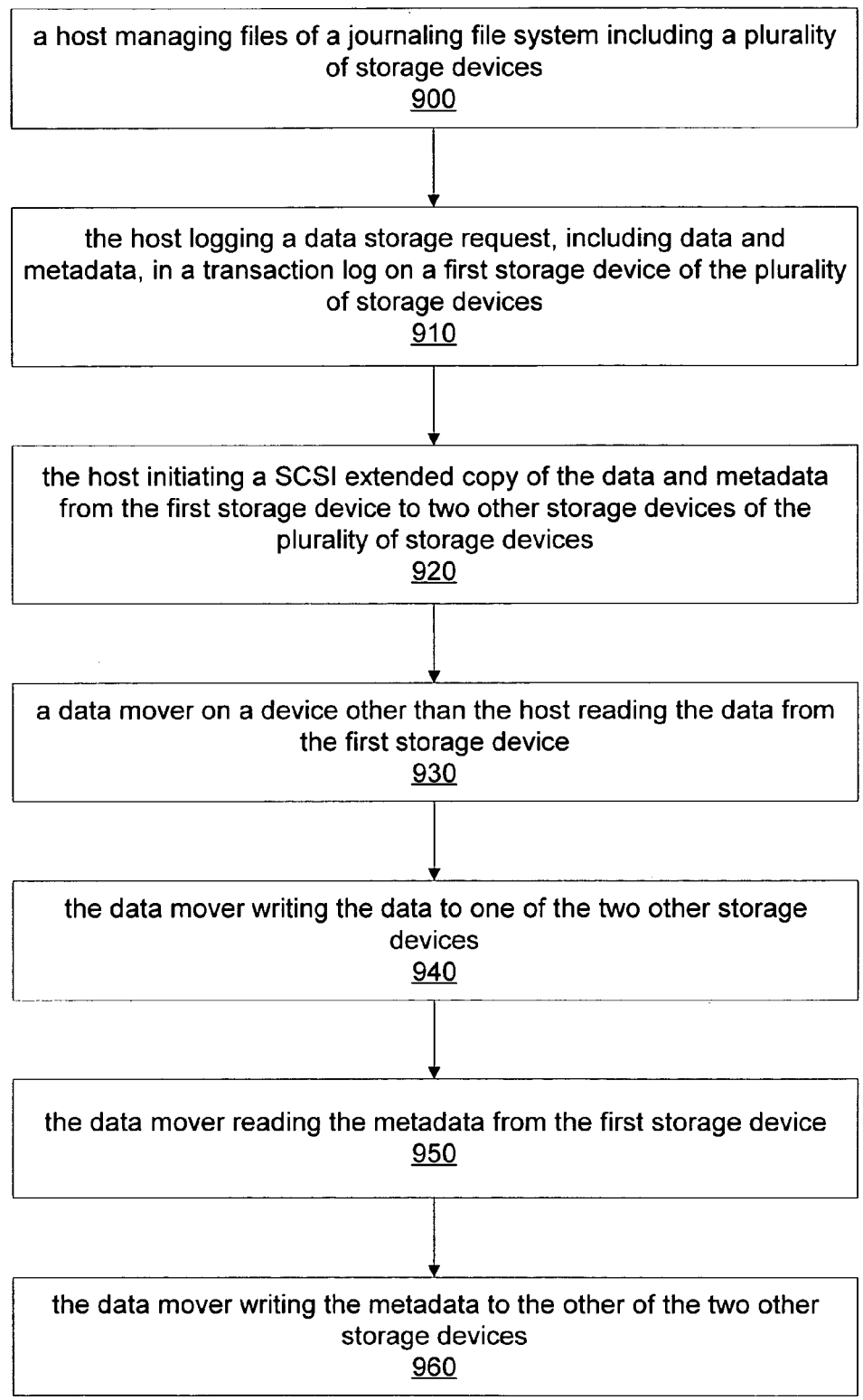
FIG. 10 is a flowchart illustrating a method for a journaling file system to use a SCSI extended copy command as a third party copy command, in one embodiment.

FIG. 10 is a flowchart illustrating one embodiment of a method for a journaling file system to use a SCSI extended copy command as a third party copy command. A host or file server may manage files of a journaling file system that includes two or more storage devices, as illustrated by block 900. For example, file system 120 may be a journaling file system and may manage files including files on storage devices 140, 150, and 160. In one embodiment, file system 120 may log a data storage request, including data and metadata, in a transaction log on a first storage device of a plurality of storage devices, as illustrated by block 910. For instance, file system 120 may receive a data storage request from client 110 and may log both data and metadata associated with the data storage request in log 600 on storage device 140, in one embodiment.

After logging the data and metadata of the received data storage request, file system 120 may, in one embodiment, initiate a SCSI extended copy of the data and metadata from the first storage device to two other storage devices of the plurality of storage devices in the file system, as illustrated by block 920. In one embodiment, file system 120 may issue two different SCSI extended copy commands, one for moving the data and one for moving the metadata. In another embodiment, however, file system 120 may only initiate a single SCSI extended copy command that is configured to move both the data and metadata. For example, data mover 200 may be configured to implement SCSI extended copy commands to move data between storage device 140 and storage devices 150 and 160 and file system 120 may be configured to request the movement of logged data.

In response to the initiation of the SCSI extended copy command, a device implementing the SCSI extended copy may read the data from the first storage device, as illustrated by block 930 and may write the data to another storage device, as illustrated by block 940. For example, data mover 200 may read data from log 600 on storage device 140 to storage device 150, in one embodiment. The device implementing the SCSI extended copy may also read the metadata from the first storage device and write it to another storage device, as illustrated by blocks 950 and 960. For instance, data mover 200 may read the metadata from storage device 140 and write the metadata to storage device 160. In one embodiment the metadata may be written to the save device as the data, while in other embodiments, the data and metadata may be written to different storage devices.

Please note that the steps illustrated in FIG. 10 represent only one of many possible embodiments of the method described above. Other embodiments may use fewer, additional, or different steps to accomplish the same result.

Figure 11:
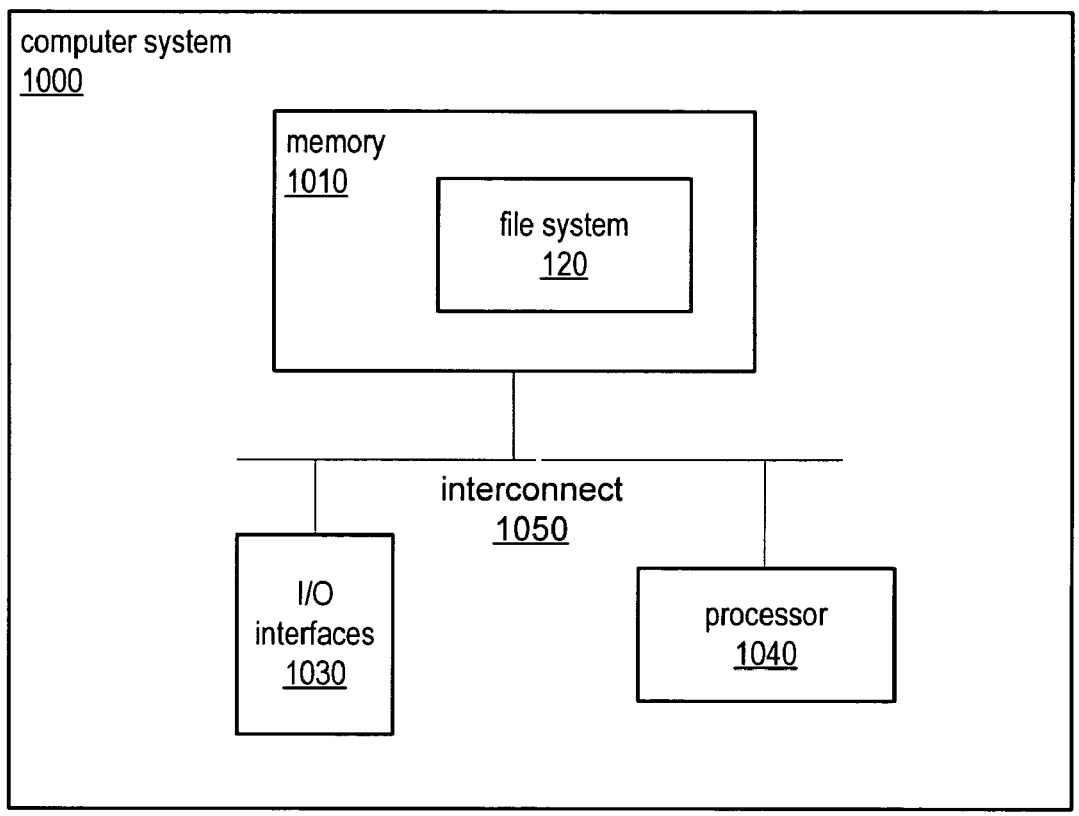
FIG. 11 is a block diagram illustrating a computer system suitable for applying third party copy commands to multi-device or journaling file systems, according to one embodiment.

FIG. 11 illustrates a computing system capable of implementing a file system including file system software capable of utilizing external data movers or third party copy commands to multi-device or journaling file systems as described herein and according to various embodiments. Computer system 1000 may be any of various types of devices, including, but not limited to, a personal computer system, desktop computer, laptop or notebook computer, mainframe computer system, handheld computer, workstation, network computer, a consumer device such as a mobile phone, pager, or any type of networkable peripheral device such as storage devices, switches, modems, routers, etc, or in general any type of networkable computing device. Computer system 1000 may include at least one processor 1040. Processor 1040 may couple across interconnect 1050 to memory 1010 and I/O interfaces 1030. I/O interfaces 1030 may be any of various types of interfaces configured to couple with and communicate with other devices, according to various embodiments. In one embodiment I/O interfaces 1030 may represent a network interface configured to couple with and communicate over network 100 illustrated in FIG. 2 and described above.

Memory 1010 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 1010 may include program instructions configured to apply third party copying commands to multi-device file systems as described above. In certain embodiments memory 1010 may include program instructions configured to implement a file system, such as file system 120. In one embodiment, file system 120 may include program instructions configured to apply third party copy commands to multi-device file systems.

Although the embodiments above have been described in detail, numerous variations and modifications will become apparent once the above disclosure is fully appreciated. It is intended that the following claims be interpreted to embrace all such variations and modifications.

The invention claimed is:

1. A method, comprising:
a host for a multi-device file system instructing a data mover to move data of a file of the multi-device file system from a source storage device of a plurality of storage devices of the multi-device file system to one or more destination storage devices of the plurality of storage devices, wherein the data is accessible through the multi-device file system using a file identifier associated with the file, wherein the data mover is external to each of the plurality of storage devices and wherein the data mover is configured to copy data between any of the plurality of data storage devices;
the data mover in response to said instructing, moving the data from the source storage device to the one or more destination storage devices over a same network fabric used by the host to access data of the multi-device file system without the host reading the data from the source storage device as part of said moving; and
wherein after said moving the data remains accessible from the one or more destination storage devices through the multi-device file system using the same file identifier.

2. The method of claim 1, wherein said moving comprises the data mover writing the data to two or more destination storage devices, wherein the destination storage devices are mirrored devices of the multi-device file system.

3. The method of claim 1, wherein the data mover resides on a storage subsystem device communicably coupled to the multi-device file system and to the plurality of storage devices.

4. The method of claim 1, wherein the data mover resides on a SAN fabric device configured to couple the host to the plurality of storage devices.

5. The method of claim 1, wherein said instructing comprises sending a SCSI extended copy command to the data mover.

6. The method of claim 1, wherein the multi-device file system comprises a multi-class file system comprising a hierarchy of storage classes, the method further comprising:

monitoring access of data stored in the multi-device file system to generate access information for the data, wherein each storage class in the hierarchy of storage classes comprises one or more storage devices assigned to the storage class according to one or more characteristics of the storage class;
applying the access information to a set of policies for the multi-class file system;
performing said instructing in response to said applying;
wherein said moving comprises the data mover moving the data from one storage class to one or more other storage classes of the hierarchy of storage classes.

7. A method, comprising:
receiving a data storage request indicating data of a file of a journaling file system;
logging the data storage request in a log on a first storage device, wherein said logging includes storing the data indicated by the data storage request to the first storage device;
wherein the data storage request indicates metadata associated with the data;
instructing a data mover to move the data indicated by the data storage request from the first storage device to one or more different storage devices; and
the data mover moving the data from the first storage device to the one or more different storage devices without a host of the file system reading the data from the first storage device as part of said moving; and
the data mover moving the metadata from the first storage device to a third storage device separate from the one or more different storage devices.

8. The method of claim 7, wherein the data storage request indicates metadata associated with the data; wherein said logging further comprises storing the metadata to the first storage device; wherein said instructing comprises instructing the data mover to move the metadata from the first storage device to the different storage device, and wherein said moving further comprises moving the metadata from the first storage device to the one or more different storage devices.

9. The method of claim 8, wherein said logging comprises instructing the data mover to move the metadata from the first storage device to the third storage device.

10. The method of claim 7, further comprising the data mover writing the data to a replicated storage device, wherein the replicated storage device is a mirror of one of the one or more different storage devices.

11. A system, comprising:
a host of a multi-device, multi-class, file system;
a data mover external to the host; and
a plurality of storage devices coupled to the host and further coupled to the data mover;
wherein the multi-class file system includes a hierarchy of storage classes, each comprising one or more storage devices assigned to the storage class according to one or more characteristics of the storage class;
wherein the host is configured to instruct the data mover to move data of a file of the multi-device file system from a source storage device to one or more destination storage devices, wherein the source storage device and the destination storage devices are each assigned to one of the hierarchy of storage classes, and wherein the data is accessible through the multi-device file system using a file identifier;
wherein in response to said instructing the data mover is configured to move the data from the source storage device to the one or more destination storage devices without the host reading the data from the source storage device as part of said moving; and wherein after said moving the data is accessible from the one or more destination storage devices through the file system using the same file identifier.

12. The system of claim 11, wherein in said moving the data mover is configured to write the data to two or more destination storage devices, wherein the destination storage devices are mirrored devices of the multi-device file system.

13. The system of claim 11, wherein the data mover resides on a storage subsystem device communicably coupled to the multi-device file system and to the plurality of storage devices.

14. A device, comprising:
a processor; and
a memory coupled to the processor, wherein the memory comprises program instructions configured to instruct an external data mover to move data of a file of a multi-device file system from a source storage device of a plurality of storage devices of the file system to one or more destination storage devices of the plurality of storage devices, wherein the data is accessible through the file system using a file identifier associated with the file, wherein the data mover is external to each of the plurality of storage devices and wherein the data mover is configured to copy data between any of the plurality of data storage devices;

wherein in response to said instructing the data mover is configured to move the data from the source storage device to the one or more destination storage devices over a same network fabric used by the host to access data of the multi-device file system without a host of the file system reading the data from the source storage device as part of said moving; and wherein after said moving the data is accessible from the one or more destination storage devices through the file system using the same file identifier.

15. The device of claim 14, wherein in said moving the data mover is configured to write the data to two or more destination storage devices, wherein the two or more destination storage devices are mirrored devices of the multi-device file system.

16. The device of claim 14, wherein the data mover resides on a storage subsystem device communicably coupled to the multi-device file system and to the plurality of storage devices.

17. A device, comprising:
a processor; and
a memory coupled to the processor, wherein the memory comprises program instructions configured to:
receive a data storage request indicating data of a file of a journaling file system, wherein the data storage request indicates metadata associated with the data;

log the data storage request in a log on a first storage, wherein said logging comprises storing the data indicated by the data storage request to the first storage device;

instruct an external data mover to move the data indicated by the data storage request from the first storage device to one or more different storage device; and wherein the data mover is configured to move the data from the first storage device to the one or more different storage devices and move the metadata from the first storage device to a third storage device separate from the one or more different storage devices.

18. The device of claim 17, wherein the data storage request indicates metadata associated with the data; wherein in said logging the program instructions are configured to store the metadata to the first storage device; wherein in said instructing the program instructions are configured to instruct the data mover to move the metadata from the first storage device to the one or more different storage devices wherein in said moving the data mover is configured to move the metadata from the first storage device to the one or more different storage devices.

19. The device of claim 18, wherein in said logging the program instructions are configured to instruct the data mover to move the metadata from the first storage device to the third storage device.

20. A computer accessible medium, comprising executable program instructions configured to implement:
a host of a multi-device, multi-class, file system instructing a data mover, external to the host, to move data of a file from a source storage device of a plurality of storage devices of the multi-device file system to one or more destination storage devices of the plurality of storage devices, wherein the multi-class file system includes a hierarchy of storage classes, each comprising one or more storage devices assigned to the storage class according to one or more characteristics of the storage class, wherein the source storage device and the destination storage devices are each assigned to one of the hierarchy of storage classes, and wherein the data is accessible through the file system using a file identifier associated with the file;

wherein the data mover is configured in response to said instructing to move the data from the source storage device to the one or more destination storage devices without the host reading the data from the source storage device as part of said moving; and wherein after said moving the data is accessible from the one or more destination storage devices through the file system using the file identifier.

* * * * *